| United States Patent [19] | [11] | 3,917,736 |
|---|---|---|
| Frech et al. | [45] | Nov. 4, 1975 |

[54] OXIDATIVE DEHYDROGENATION OF 2,3-DIMETHYL-BUTENES TO 2,3-DIMETHYLBUTADIENE

[75] Inventors: Kenneth J. Frech, Tallmadge; Frederick H. Hoppstock, Massillon; David A. Hutchings, Stow, all of Ohio

[73] Assignee: The Goodyear Tire & Rubber Company, Akron, Ohio

[22] Filed: June 21, 1974

[21] Appl. No.: 481,583

[52] U.S. Cl. ............................................. 260/680 E
[51] Int. Cl.$^2$ ........................................... C07C 5/48
[58] Field of Search .................... 260/680 E, 680 D

[56] References Cited

UNITED STATES PATENTS

| 3,159,688 | 12/1964 | Jennings et al. .................. 260/680 E |
| 3,764,632 | 10/1973 | Takenaka et al. ................. 260/680 E |

Primary Examiner—Paul M. Coughlan, Jr.
Attorney, Agent, or Firm—F. W. Brunner; J. Y. Clowney

[57] ABSTRACT

A method which comprises the oxidative dehydrogenation of at least one hydrocarbon selected from the group of 2,3-dimethyl-1-butene and 2,3-dimethyl-2-butene in the presence of a catalyst comprising cobalt molybdate is disclosed.

6 Claims, No Drawings

OXIDATIVE DEHYDROGENATION OF 2,3-DIMETHYL-BUTENES TO 2,3-DIMETHYLBUTADIENE

This application is directed to a process for the preparation of 2,3-dimethyl-1,3-butadiene by the oxidative dehydrogenation of 2,3-dimethyl-1-butene or 2,3-dimethyl-2-butene or mixtures thereof.

The invention provides an oxidative dehydrogenation process which reduces or eliminates endothermic heat requirements, permits continuous burn-off of carbon from the catalyst, permits longer catalyst life, provides higher per pass conversions and higher yields or selectivity to the desired products. Thus, it is obvious that the process of this invention is somewhat more economical than those of the prior art.

According to the invention, 2,3-dimethyl-1-butene and/or 2,3-dimethyl-2-butene are oxidatively dehydrogenated in the presence of a catalyst comprising cobalt molybdate ($CoMoO_4$), supported or unsupported.

The oxidative dehydrogenation process of this invention can be conducted under fairly reasonable reaction conditions. For instance, the temperatures employed may vary from about 350° to 650°C with 450° to 600°C being more preferred.

In order to provide a better temperature control of the process, it is usually desirable to employ a diluent, but a diluent is not absolutely required. Materials such as steam, nitrogen, methane, hydrogen, carbon dioxide or other diluents known to be stable under the reaction conditions may be employed. When a diluent is employed, the diluent to hydrocarbon mole ratio may be from 1/1 to 20/1 with a more preferred range of 2/1 to 5/1.

While oxygen may be used as an oxidant, it is usually preferred and more economical to employ air as the oxidant. The oxidant mole ratio to the hydrocarbon feed in terms of $O_2/HC$ should be between 0.1/1 and 10/1 with a more preferred range being 0.5/1 to 5/1.

The rate at which the hydrocarbon is passed through the reactor and is in contact with the catalyst is the Liquid Hour Space Velocity (LHSV) and is defined as the liquid volume of hydrocarbon passed over a given volume of catalyst per hour. The LHSV employed in this invention should range from about 0.1 to about 100 with a more preferred LHSV of 0.5 to 10 being employed.

The catalyst employed in this invention is cobalt molybdate ($CoMoO_4$). The catalyst can be used in either its pure form such as pulverized $CoMoO_4$. It may be employed in the manner where it is deposited on some inert support material normally employed in hydrocarbon conversion processes. Examples of such relatively inert materials are alumina, silica alumina, silica, silicon carbide, pumice and the like.

The catalyst may be impregnated on a normal catalytic support material known in the art, for instance, alumina, silica, silica-alumina, magnesia, clays, pumice, titania, zirconias and the like.

On the other hand, the catalyst of this invention may be coprecipitated from solutions containing various salts of cobalt, molybdenum and aluminum as the hydroxides. These may then be calcined to produce the final catalytic substance.

Of course, it is usually conventional in a heterogeneous catalytic process such as that of this invention to employ continuous reaction systems with either fixed bed catalysts or fluidized bed catalysts. Therefore, it is usually preferred to employ the catalyst of this invention in a form which will not crush or be attrited easily. For that reason, it is usually more satisfactory to impregnate the catalyst from its salt onto a suitable rugged support in the form of pellets. It has been found in practice that the most suitable support is alumina. However, that is not to imply that other support materials such as silica, silica-alumina, magnesia, titania or zirconia are not acceptable or even crushed pumice and the like could be employed as the catalyst support.

The active catalyst itself may be obtained commercially. Cobalt molybdate at about 98.5 percent ($CoMoO_4 \cdot H_2O$) purity can be obtained commercially from The Ventron Corporation, Beverly, Mass. USA.

The catalyst may be treated with small amounts of a basic material such as potassium hydroxide to moderate the acidic nature of the catalyst. The moderation or neutralization of the catalyst tends to prevent isomerization of the 2,3-dimethyl-2-butene to 2,3-dimethyl-1-butene and also prevents or retards the burning of the reactants and/or the products from being burned as it lowers the amount of carbon dioxide in effluent. This treatment also tends to prevent degradation of the reactants and/or products to lower hydrocarbons or lights. About 0.1 to about 10 percent by weight of the base may be employed with about 0.5 to about 2 percent being more preferred.

The invention is further illustrated by reference to the following examples which are intended to be illustrative rather than restrictive of the scope.

EXAMPLE I

Into a reactor composed of a 15 millimeter (mm) internal diameter quartz tube, there was placed 10 cubic centimeters (cc) of cobalt molybdate, obtained as previously. The reactor was heated in a tubular furnace and the temperature was controlled by means of thermocouples placed in various locations along the reactor. The hydrocarbon feed which was 2,3-dimethylbutene-2 and the water diluent were introduced as liquids using a syringe infusion pump. The air or oxygen and nitrogen were metered into the system. The reactor effluent was analyzed using gas chromotographic techniques.

The results are reported in the table below in which column 1 is the run number, column 2 is the water to hydrocarbon mole ratio used to make steam which was the diluent, column 3 is the oxygen to hydrocarbon mole ratio, column 4 is the conversion of the 2,3-dimethyl-2-butene in mole percent, column 5 is the yield of 2,3-dimethyl-1,3-butadiene in mole percent and column 6 is the selectivity to 2,3-dimethyl-1,3-butadiene in percent. In these runs, the catalyst employed was 15 percent by weight of cobalt molybdate ($CoMoO_4$) on gamma alumina ($Al_2O_3$) treated with 5 ml of 0.36 N potassium hydroxide solution. The temperature in runs 1, 2 and 3 was 450°C and the LHSV 0.5. In runs 4, 5, 6 and 7, the temperature was 525°C and the LHSV was 0.5.

TABLE 1

| 1 Run No. | 2 $H_2O/HC$ Mole Ratio | 3 $O_2/HC$ Mole Ratio | 4 Conv Mole % | 5 Yield Mole % | 6 Selectivity % |
|---|---|---|---|---|---|
| 1 | 3.1 | 1.2 | 40 | 27 | 66 |
| 2 | 3.0 | 1.6 | 46 | 32 | 70 |
| 3 | 3.4 | 1.3 | 42 | 28 | 68 |
| 4 | 3.4 | 1.3 | 53 | 38 | 71 |

TABLE 1-continued

| 1 Run No. | 2 H₂O/HC Mole Ratio | 3 O₂/HC Mole Ratio | 4 Conv Mole % | 5 Yield Mole % | 6 Selectivity % |
|---|---|---|---|---|---|
| 5 | 3.5 | 1.4 | 52 | 38 | 72 |
| 6 | 3.3 | 1.3 | 54 | 39 | 72 |
| 7 | 3.2 | 1.5 | 56 | 38 | 67 |

EXAMPLE II

In these experiments which were conducted in the same manner as in Example I except that certain conditions were changed and the cobalt molybdate catalyst composition was varied. The results are set forth below. In these experiments, the temperature employed was 500°C.

TABLE 2

| Run No | Res Time Sec | Mole Ratio H₂O/HC | Mole Ratio O₂/HC | Yield in mole % | Selectivity in % | LHSV |
|---|---|---|---|---|---|---|
| 1 | 1 | 9 | 2 | 33 | 70 | 1.4 |
| 2 | 2 | 4 | 2 | 33 | 68 | 0.9 |
| 3 | 2 | 6 | 4 | 41 | 62 | 0.5 |
| 4 | 2 | 5 | 2 | 45 | 73 | 0.9 |

| Run No. | Catalyst |
|---|---|
| 1 | 100% CoMoO₄ pelletized |
| 2 | physical mixture of CoMoO₄ with KOH treated Al₂O₃ 25/75 percent |
| 3 | physical mixture of CoMoO₄ with KOH treated Al₂O₃ 25/75 percent |
| 4 | 25% CoMoO₄ impregnated on α-Al₂O₃ |

The cobalt molybdate of this invention when employed on a support should range from about 3 to about 50 weight percent based on the weight of the support, with about 10 to 30 percent by weight being preferred.

Thus, the invention is a method which comprises the oxidative dehydrogenation of at least one hydrocarbon selected from the group of 2,3-dimethyl-1-butene and 2,3-dimethyl-2-butene in the presence of a catalyst comprising cobalt molybdate. Air is preferred as the oxidant in amounts of 0.5/1 to 5/1 oxygen/hydrocarbon mole ratio. The cobalt molybdate is preferred to be impregnated on a support, particularly alumina. Water is preferably used as a diluent. It is preferred to employ a mixture of 2,3-dimethyl-1-butene and 2,3-dimethyl-2-butene wherein the 2,3-dimethyl-2-butene comprises from about 65 to 80 mole percent of the mixture.

While certain representative embodiments and details have been shown for the purpose of illustrating the invention, it will be apparent to those skilled in this art that various changes and modifications may be made therein without departing from the spirit or scope.

What is claimed is:

1. The method of preparing 2,3-dimethylbutadiene by the oxidative dehydrogenation of 2,3-dimethyl-1-butene or 2,3-dimethyl-2-butene or mixtures thereof which comprises contacting at least one hydrocarbon selected from the group consisting of 2,3-dimethyl-1-butene and 2,3-dimethyl-2-butene with a catalyst consisting of cobalt molybdate or cobalt molybdate treated with potassium hydroxide in amounts from about 0.5 to about 2 percent by weight of the cobalt molybdate, in the presence of an oxidant in an amount to provide an oxygen/hydrocarbon mole ratio ranging from 0.5/1 to 5/1, at a temperature range from 350°C to 650°C and at an LHSV of from 0.5 to 10.

2. The method according to claim 1 in which the cobalt molybdate is impregnated on a support.

3. The method according to claim 2 in which the support is alumina and the cobalt molybdate is in amounts ranging from about 3 to about 50 weight percent based on the weight of the alumina.

4. The method according to claim 1 in which water is employed as a diluent.

5. The method according to claim 1 in which a mixture of 2,3-dimethyl-1-butene and 2,3-dimethyl-2-butene is employed in which about 65 to about 80 mole percent of the mixture comprises 2,3-dimethyl-2-butene.

6. The method according to claim 5 in which air is employed as the oxidant in amounts to provide an oxygen/hydrocarbon mole ratio of 0.5/1 to 5/1 and in which the cobalt molybdate is impregnated on an alumina support in amounts ranging from about 10 to about 30 percent by weight of the alumina and in which water is employed as a diluent in amounts of 2/1 to 5/1 mole ratio of diluent/hydrocarbon.

* * * * *